Nov. 30, 1937.  F. BLACK  2,100,730
ANIMAL CLAMP
Original Filed June 6, 1936
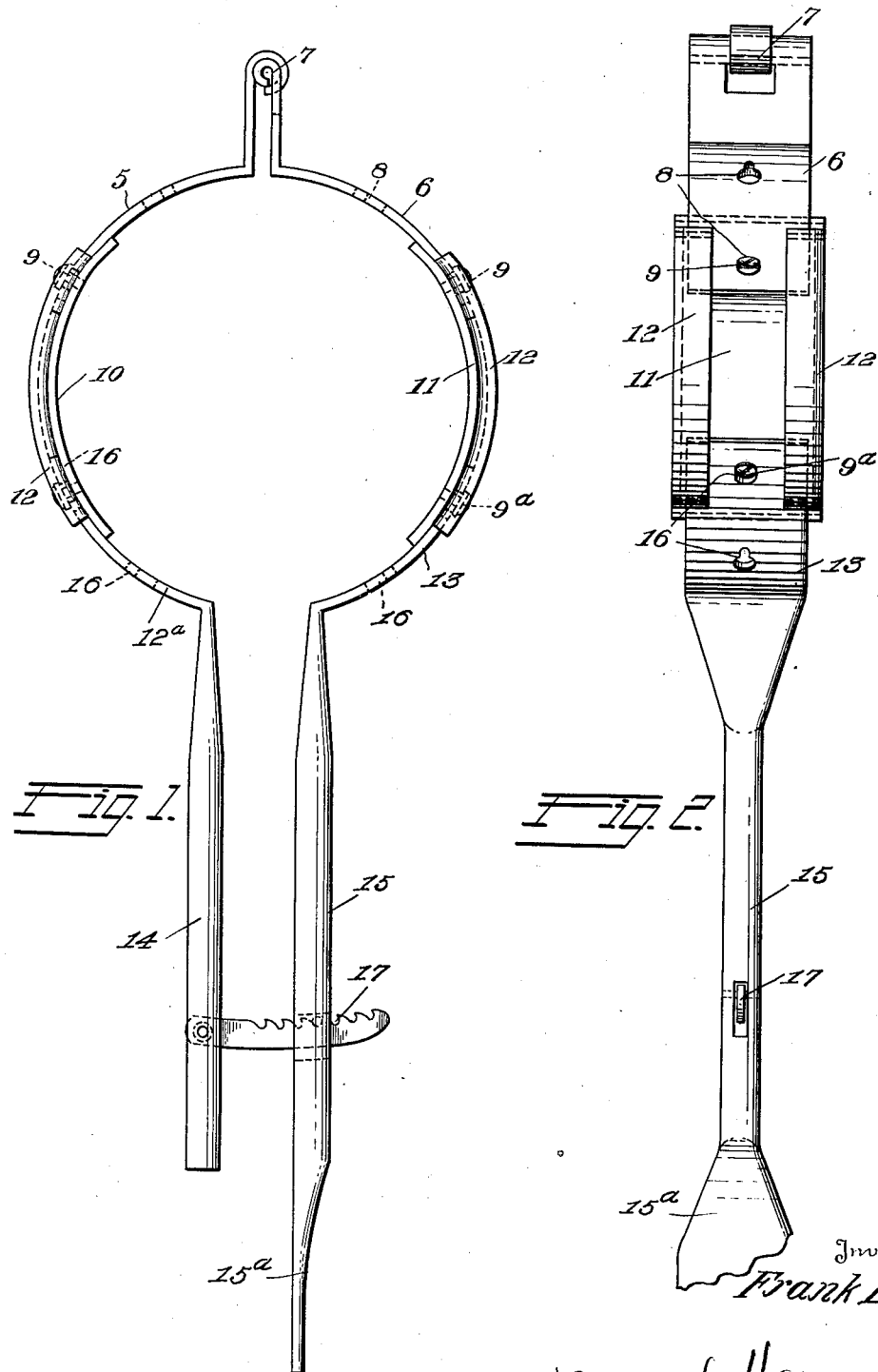
Inventor
Frank Black,
By Samuel Herrick
Attorney Patented Nov. 30, 1937

2,100,730

UNITED STATES PATENT OFFICE 2,100,730

ANIMAL CLAMP

Frank Black, Christmas, Ariz.

Application June 6, 1936, Serial No. 84,004
Renewed September 30, 1937

9 Claims. (Cl. 128—346)

This invention relates to holding clamps for animals and it has for its object to provide a clamp adapted to hold cats, dogs and other small animals firmly and securely, during the time that the animals are being operated upon or treated, for any desired purpose.

Only one of the clamps is illustrated in the accompanying drawing, but it will be understood that the clamps are used in pairs, and when in use, the head of the animal lies between the front feet and the clamp encircles the neck and the front feet. The rear clamp encircles the animal just in front of the hips and between the stifles and hock, holding the rear legs securely against movement.

The clamps are made with flattened holding portions for the reception of the knee and the toe of the operator, so that by placing the knee on the flattened holding portion of the front clamp handle and the toe on the rear clamp handle, one man may hold the animal while performing the operations of spaying or castration, or administering medicine, trimming the nails, or otherwise.

In the accompanying drawing:

Figure 1 is a side elevation of a clamp constructed in accordance with the invention; and Fig. 2 is a side elevation of the plan.

Like numerals designate corresponding parts throughout the several figures of the drawing.

The clamp of the present invention is made up of a plurality of parts comprising hinge sections 5 and 6 that are hingedly united to each other in any desired manner, the hinged connections being indicated at 7. These hinge sections are provided with key hole slots 8. The key hole slots 8 are intended for engagement with headed studs 9, riveted or otherwise secured to arcuate segments 10 and 11.

These segments have their edges overturned through a portion of their length, as indicated at 12, to form channels, within which the lower ends of the hinge sections 5 and 6 are received. These channels also receive the upper ends 12 and 13 of handle sections 14 and 15, and these portions 12 and 13 are likewise provided with key hole slots 16.

There may be any number of these key hole slots in the hinge sections 5 and 6 and the handle sections respectively, and by engaging the proper one of them with the stud 9 at the upper portion of the curved segment or with a corresponding stud 9ª at the lower portion of the segment, the effective diameter of the area embraced by the clamp may be increased or diminished at will. Thus, the clamp may be adapted to either large or small animals, within certain limitations.

A self-locking latch is provided at 17, this being of a conventionl form. Any suitable type of latch such as is commonly employed in holding the handles of tongs together, may be used. One of the handles is flattened or otherwise shaped at 15ª to provide a portion adapted to receive the toe or knee of the operator, so that the animal may be held by this means, while leaving the hands of the operator free to work upon the animal.

I may form the handle members out of tubular stock, flattening this stock to provide the flattened portion 15ª and also to provide the flattened portions 12 or 13, while leaving the intermediate portions of tubular formation. However, the particular shape of these intermediate portions is immaterial.

Thus, it will be seen that this invention provides a simple clamping tongs, adapted to embrace and hold an animal as described, to be automatically locked in closed position, to be readily assembled and disassembled, and to be held by the knee or foot of the user, to thereby leave the hands free.

Further, it is to be noted that all of this is accomplished through the use of relatively cheap, stamped sheet metal parts. Many ways will readily suggest themselves to those skilled in the art, of varying the proposed construction. Therefore, I wish it to be understood that the invention includes within its purview whatever changes fairly come within either the terms or the spirit of the appended claims.

Having described my invention, what I claim is:

1. A clamp of the character described, comprising two semi-circular, hingedly connected portions shaped and dimensioned to embrace the neck and paws of an animal to be operated upon, handles projecting from said portions, and a flattened holding portion for the reception of the knee of the operator, at the extremity of one of said handles, said flattened portion lying substantially parallel with the axes of the semicircular portions.

2. A structure as recited in claim 1, wherein said semi-circular portions comprise segments, and means for detachably connecting said segments to the handle portions.

3. A clamp of the character described, comprising two hingedly connected hinge sections, a pair of curved segments, and a pair of handles and means for detachably connecting the ends of the hinge sections and the ends of the handle sections to said segments.

4. A structure as recited in claim 3, in combination with a flattened knee-receiving portion upon one of said handles.

5. A structure as recited in claim 3, in combination with a latch for uniting the handle sections.

6. A device of the character described, comprising a pair of hingedly connected hinge sections, a pair of handle sections, a pair of interposed curved segments provided with channels for the reception of the ends of the hinge sections and the ends of the handle sections, and means for holding the said segments against endwise movement with respect to the hinge sections and the handle sections.

7. A device of the character described, comprising a pair of hingedly connected hinge sections, having key hole slots formed therein, a pair of handle sections comprising flattened end portions having key hole slots formed therein, and a pair of interposed curved segments having their edges turned over to form channels within which the ends of the hinge sections and the ends of the handle sections are received, and members carried by the channel sections for engaging in said key hole slots.

8. A structure as recited in claim 7, in combination with a latch for holding the handles together.

9. A structure as recited in claim 7, in combination with a flattened, knee-receiving, end portion upon one of said handles.

FRANK BLACK.